(12) United States Patent
Xu

(10) Patent No.: US 11,501,625 B2
(45) Date of Patent: Nov. 15, 2022

(54) REMINDER METHOD AND APPARATUS AND ELECTRONIC DEVICE

(71) Applicant: Sony Corporation, Tokyo (JP)

(72) Inventor: Yuanli Xu, Beijing (CN)

(73) Assignee: Sony Group Corporation, Tokyo (JP)

(*) Notice: Subject to any disclaimer, the term of this patent is extended or adjusted under 35 U.S.C. 154(b) by 41 days.

(21) Appl. No.: 16/756,811

(22) PCT Filed: Jan. 23, 2018

(86) PCT No.: PCT/CN2018/073756
§ 371 (c)(1),
(2) Date: Apr. 16, 2020

(87) PCT Pub. No.: WO2019/144260
PCT Pub. Date: Aug. 1, 2019

(65) Prior Publication Data
US 2021/0366262 A1    Nov. 25, 2021

(51) Int. Cl.
*H04M 1/72454*  (2021.01)
*G08B 21/24*  (2006.01)
*H04M 1/02*  (2006.01)
*H04M 1/60*  (2006.01)

(52) U.S. Cl.
CPC .......... *G08B 21/24* (2013.01); *H04M 1/0266* (2013.01); *H04M 1/6016* (2013.01); *H04M 1/72454* (2021.01); *H04M 2250/12* (2013.01)

(58) Field of Classification Search
CPC .............. G08B 21/24; H04M 1/72454; H04M 1/0266; H04M 1/6016; H04M 2250/12
USPC .......................................................... 455/566
See application file for complete search history.

(56) References Cited

U.S. PATENT DOCUMENTS

| 10,514,888 B1* | 12/2019 | Rodgers ................. G06N 20/00 |
| 2009/0063141 A1 | 3/2009 | Huang |
| 2014/0372109 A1* | 12/2014 | Iyer .......................... H03G 3/32 |
| | | 704/225 |

FOREIGN PATENT DOCUMENTS

| CN | 106488036 A | 3/2017 |
| CN | 106873937 A | 6/2017 |

OTHER PUBLICATIONS

International Search Report and Written Opinion for corresponding Patent Application No. PCT/CN2018/073756 dated Sep. 28, 2018.

* cited by examiner

*Primary Examiner* — Ankur Jain
(74) *Attorney, Agent, or Firm* — Renner, Otto, Boisselle & Sklar, LLP

(57) ABSTRACT

A reminder method and apparatus and an electronic device. When a difference between a voice volume of a user in conversation and a reference volume is greater than a preset threshold, output of reminder to the user is controlled. Thus, the user may be reminded when his/her conversation is too loud for the surrounding environment automatically according to a comparing result of the voice volume of the user in conversation and the reference volume, and user experience may be improved.

10 Claims, 5 Drawing Sheets

REMINDER METHOD AND APPARATUS AND ELECTRONIC DEVICE

TECHNICAL FIELD

This disclosure relates to the field of communication technologies, and in particular to a reminder method and apparatus and an electronic device.

BACKGROUND

As the development of communication technologies, such electronic devices as smart mobile phones, tablet computers, and smart watches, etc., are widely used. Such electronic devices bring great convenience to exchanges and communications between users inside and outside of the home. For example, during the day in a department store, a user may video chat with a friend; and in a hotel room late at night, a user on a business travel may have a voice conversation with his/her family.

It should be noted that the above description of the background art is merely provided for clear and complete explanation of this disclosure and for easy understanding by those skilled in the art. It should not be assumed that the above description is known to those skilled in the art just because the above description is found in the background section of this disclosure.

SUMMARY

When using a smart mobile phone for voice conversation or video chat, a user may not consider the surrounding environment (e.g., due to user agitation, excitement, anger, etc.), which may result in the volume of the conversation/chat being too loud for the surrounding environment and disturbing others.

Embodiments of this disclosure provide a reminder method and apparatus and an electronic device. According to the disclosure, when a difference between a voice volume of a user in conversation and a reference volume is greater than a preset threshold, output of reminder to the user is controlled. Hence, after receiving the reminder, the user may be aware that the conversation may affect others in the surrounding environment, thereby causing the user to lower the volume of the conversation. Thus, the user may be reminded when his/her conversation is too loud for the surrounding environment automatically according to a comparing result of the voice volume of the user in conversation and the reference volume, and user experience may be improved. Furthermore, since the reminder is triggered only when the difference is greater than the threshold, the triggering of the reminder is reasonable.

According to a first aspect of the embodiments of this disclosure, there is provided a reminder method performed by an electronic device, the method comprising: detecting a voice volume of a user of the electronic device using an audio sensor of the electronic device; calculating using a processor of the electronic device a difference between the detected voice volume and a reference volume; and controlling with the processor an output of a reminder to the user when the calculated difference is greater than a first threshold.

According to a second aspect of the embodiments of this disclosure, there is provided a reminder apparatus including: an audio sensor configured to output a signal corresponding to detected audio; a processor configured to: receive from the audio sensor a voice volume of a user of an electronic device; calculate a difference between the detected voice volume of the user and a reference volume; and control an output of a reminder to the user when the calculated difference is greater than a first threshold.

According to a third aspect of the embodiments of this disclosure, there is provided an electronic device, including: the reminder apparatus as described in the second aspect; and a loudspeaker and/or a display configured to output a reminder to a user based on control of the processor of the reminder apparatus.

An advantage of the embodiments of this disclosure exists in that when a difference between a voice volume of a user in conversation and a reference volume is greater than a preset threshold, output of reminder to the user is controlled. Hence, after receiving the reminder, the user may be aware that the conversation may affect others in the surrounding environment, thereby causing the user to lower the volume of the conversation. Thus, the user may be reminded when his/her conversation is too loud for the surrounding environment automatically according to a comparing result of the voice volume of the user in conversation and the reference volume, and user experience may be improved. Furthermore, since the reminder is triggered only when the difference is greater than the threshold, the triggering of the reminder is reasonable.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTIONS

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. These embodiments are illustrative only, and not intended to limit this disclosure.

In the embodiments of this disclosure, the terms "electronic equipment" and "electronic device" are interchangeable. And in the embodiments of this disclosure, implementations of this disclosure may mainly described by taking a portable electronic device in a form of a mobile telephone (also referred to as "a mobile phone"). However, it should be noted that "electronic device" in the embodiments of this disclosure should not be limited to a mobile telephone, rather, it may be related to suitable electronic devices of any types, and examples of such electronic devices may include a camera, a video camera, a tablet PC, a smart watch, smart glasses, a head-worn device, a wearable device, a fixed-line telephone, a media player, a gaming device, a PDA, and a computer, etc.

Embodiment 1

Figure 1:
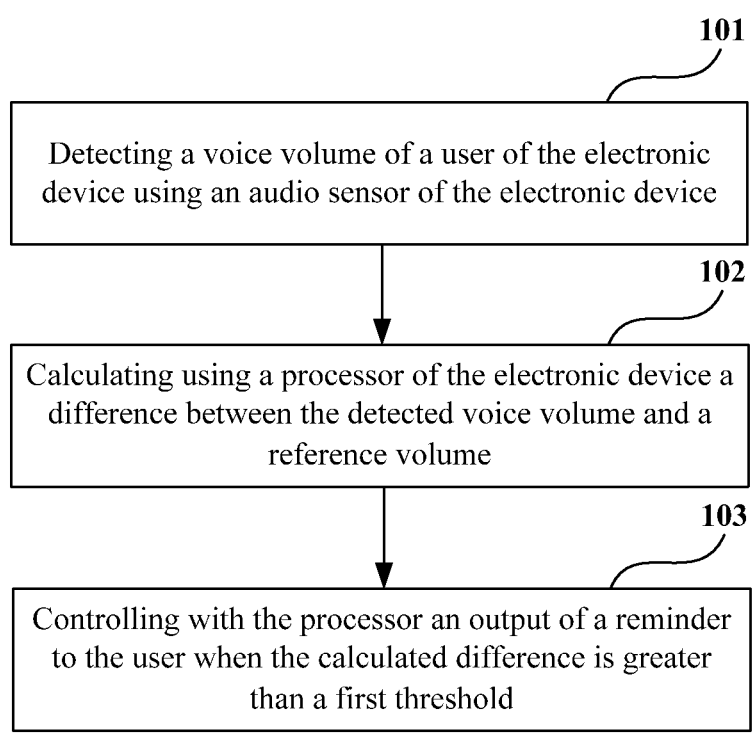
FIG. 1 is a flowchart of the reminder method of Embodiment 1 of this disclosure.

FIG. 1 is a flowchart of the reminder method of Embodiment 1 of this disclosure. The reminder method is performed by an electronic device. As shown in FIG. 1, the method includes:

step 101: detecting a voice volume of a user of the electronic device using an audio sensor of the electronic device;

step 102: calculating using a processor of the electronic device a difference between the detected voice volume and a reference volume; and step 103: controlling with the processor an output of a reminder to the user when the calculated difference is greater than a first threshold.

It can be seen from the above embodiment that when a difference between a voice volume of a user in conversation and a reference volume is greater than a preset threshold, a reminder to the user is output. Hence, by receiving the reminder, the user may be aware that his/her conversation may be too loud for the environment and affecting others around him/her, causing the user to lower the volume of the conversation. Thus, the user may be reminded when his/her conversation is too loud for the surrounding environment automatically according to a comparing result of the voice volume of the user in conversation and the reference volume and users' experiences may be improved. Furthermore, since the reminder is triggered only when the difference is greater than the threshold, the triggering of the reminder is reasonable.

In this embodiment, the conversation of the user may include conversations of various communication modes, such as outgoing and incoming of calls, video chat, voice chat, a voice message, or a left voice message, etc.

In step 101, the voice volume of the user may be obtained by detecting a voice volume with the audio sensor of the electronic device.

In this embodiment, detecting of the voice volume of the user and the environmental noise may refer to existing methods.

For example, in an existing dual-microphone system of a mobile phone, a first microphone is set at the bottom of the mobile phone, which is close to a mouse of a user, and a second microphone is set at the top of the reverse side of the mobile phone to detect environmental noise.

In the conversation, since sound sources of the environmental noises are usually far away from the user, an environmental noise signal detected by the first microphone is the same as an environmental noise signal detected by the second microphone. A sound signal collected by the first microphone is added to an inversion signal of a sound signal detected by the second microphone, and the adding result is the actual voice signal of the user.

In this embodiment, the reference volume may be set according to an actual situation. For example, the reference volume may be an environmental noise volume, or a normal volume of the user.

In step 103, the reminder to the user is outputted when the difference is greater than the first threshold, controlling output of at least one of playing a specific sound or displaying a visual cue, such as a specific voice, music, sound, text, image, graphic, or picture.

For example, the specific voice may be a sound of beep, or a voice, such as pre-recorded "you may possibly disturb others", and "please turn down your volume", etc.

For example, the specific music may be favorite music set by the user itself, or may be pleasant music.

For example, the specific picture may be a funny picture, or a picture displaying such words as "you may possibly disturb others", and "please turn down your volume", etc.

For example, it may also be combining a specific voice or music and a specific picture and outputting.

In this embodiment, the first threshold may be set according to an actual situation, such as the reference volume, a particular setting method will be described later.

In this embodiment, description shall be given by taking that the reference volume is an environmental noise volume as an example.

Figure 2:
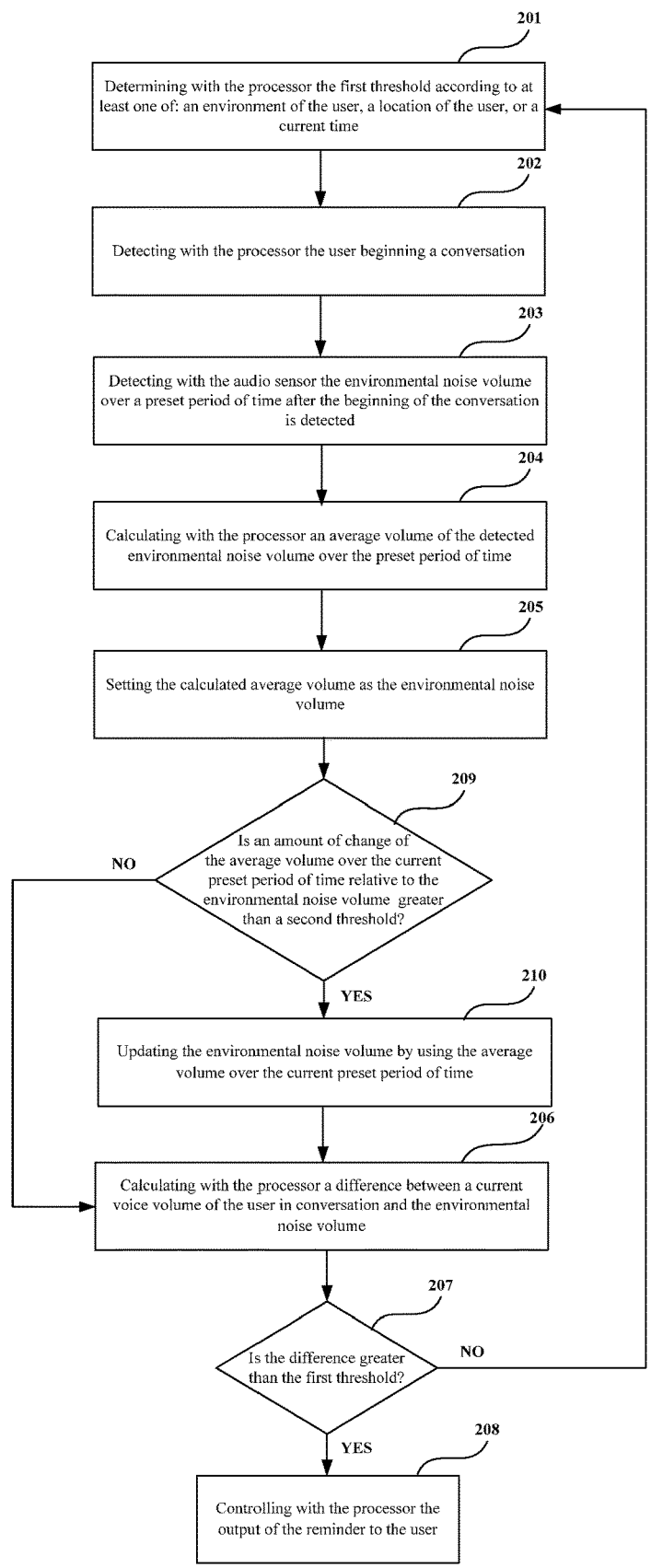
FIG. 2 is another flowchart of the reminder method of Embodiment 1 of this disclosure.

FIG. 2 is another flowchart of the reminder method of Embodiment 1 of this disclosure. As shown in FIG. 2, the method includes:

step 201: determining with the processor the first threshold according to at least one of: an environment of the user, a location of the user, or a current time;

step 202: detecting with the processor the user beginning a conversation;

step 203: detecting with the audio sensor the environmental noise volume over a preset period of time after the beginning of the conversation is detected;

step 204: calculating with the processor an average volume of the detected environmental noise volume over the preset period of time;

step 205: setting the calculated average volume as the environmental noise volume;

step 206: calculating with the processor a difference between a current voice volume of the user in conversation and the environmental noise volume;

step 207: judging with the processor whether the difference is greater than the first threshold, entering into step 208 when it is judged "yes", and turning back to step 201 when it is judged "no";

step 208: controlling with the processor the output of the reminder to the user. In step 201, the first threshold is determined according to at least one of: an environment of the user, a location of the user, or a current time.

For example, a first threshold lookup table may be preset, and the first threshold is determined via the lookup table.

TABLE 1

An example of the first threshold lookup table

| Examples of scenarios | Average environmental noise | Time | Location | First threshold |
|---|---|---|---|---|
| Threshold of listening comprehension of ears | <10 db | Night | Public area | 30 db |
| Drop of a needle | <75 db | Daytime | Public area | 50 db |
| Rustle of leafs | 75~115 db | Daytime | KTV | 100 db |
| Whisper | ... | ... | ... | ... |

In this embodiment, the data in Table 1 are only examples. As shown in Table 1, the scenarios, times and locations correspond to the first thresholds, and a corresponding first threshold may be looked up according to a scenario, a time and a location.

In step 204, the average volume of the detected environmental noise volume over the preset period of time is calculated, and is taken as the environmental noise volume. For example, an average volume of environmental noise volume over 10 seconds after conversation of the user begins is calculated, and is taken as the environmental noise volume, that is, an initial environmental noise volume is set.

In this embodiment, the environmental noise volume taken as the reference volume may be updated according to an average volume within a current preset period of time.

For example, as shown in FIG. 2, the method may further include:

step 209: judging with the processor whether an amount of change of the average volume over the current preset period of time relative to the environmental noise volume (the initial environmental noise volume) is greater than a second threshold, entering into step 210 when it is judged "yes", and entering into step 206 when it is judged "no"; and step 210: updating the environmental noise volume by using the average volume over the current preset period of time.

In this embodiment, the amount of change may be an absolute value of a difference between the average volume over the current preset period of time and the environmental noise volume, and what is measured by it is a level of change of the average volume over the current preset period of time relative to a previous volume.

In this embodiment, the second threshold may be set according to an actual situation, so that the environmental noise volume is updated when a change of the average volume over the current preset period of time relative to the previous volume is obvious.

The above description is given by taking that the reference volume is an environmental noise volume as an example. And following description shall be given by taking that the reference volume is a default volume or a normal volume of the user as an example.

Figure 3:
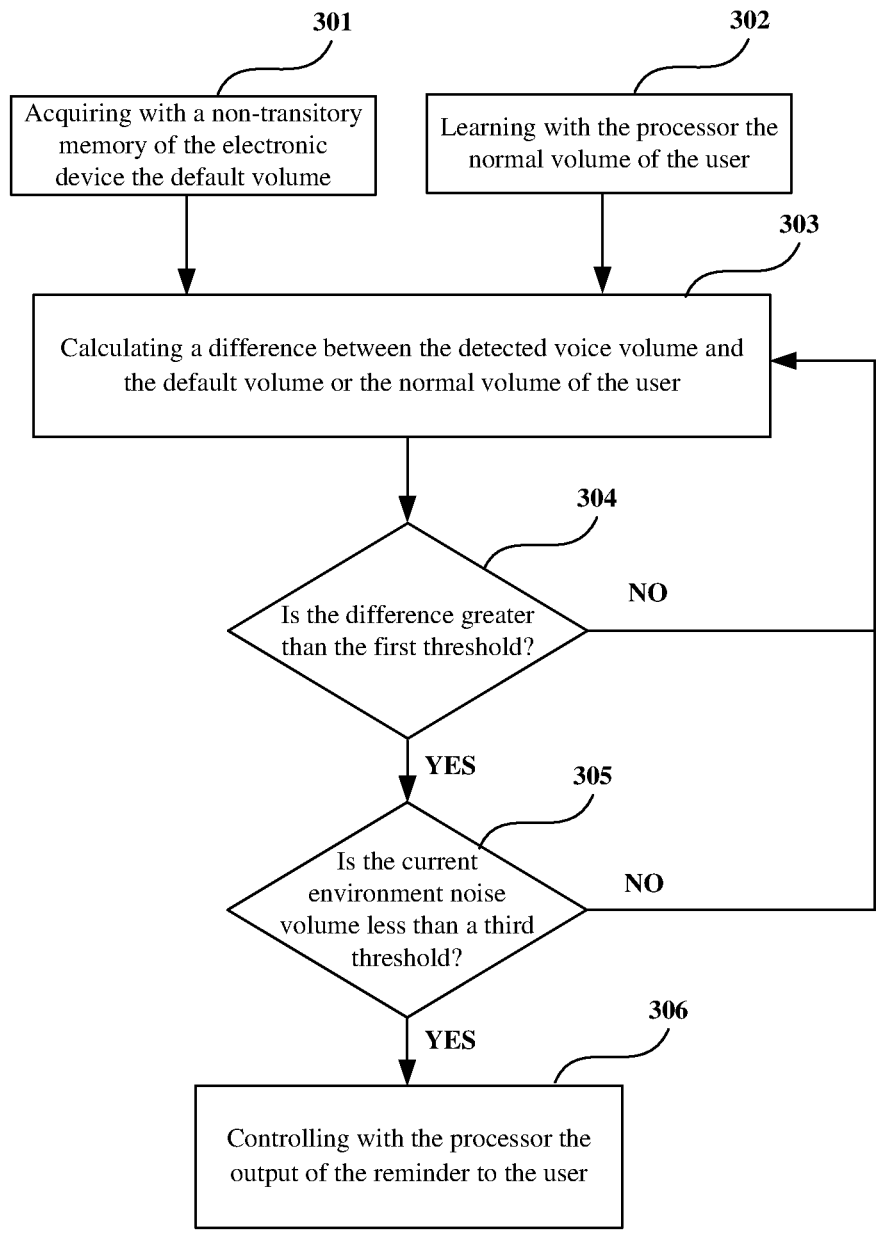
FIG. 3 is a further flowchart of the reminder method of Embodiment 1 of this disclosure.

FIG. 3 is a further flowchart of the reminder method of Embodiment 1 of this disclosure. As shown in FIG. 3, the method includes:

step 301: acquiring with a non-transitory memory of the electronic device the default volume; or step 302: learning with the processor the normal volume of the user; and step 303: calculating a difference between the detected voice volume and the default volume or the normal volume of the user;

step 304: judging whether the difference is greater than the first threshold, entering into step 305 when it is judged "yes", and turning back to step 303 when it is judged "no";

step 305: judging whether the current environment noise volume is less than a third threshold, entering into step 306 when it is judged "yes", and turning back to step 303 when it is judged "no";

step 306: controlling with the processor the output of the reminder to the user.

In this embodiment, the default volume is, for example, a volume set ex-works, such as a normal volume of an ordinary person.

In step 302, voices of the user over a period of time may be collected and a normal volume is learnt. The prior art may be referred to for a particular method of learning.

In this embodiment, the normal volume may refer to the average volume of the user over the last few months/weeks.

In step 303, before the learning in step 302 is finished, the difference between the current voice volume of the user in conversation and the default volume may be calculated; and after the learning in step 302 is finished, the difference between the current voice volume of the user in conversation and the normal volume may be calculated.

In step 304, the first threshold may be a numeral value greater than or equal to 0, and may be set according to an actual situation, so that when the current voice volume of the user is obviously higher than a normal volume of an ordinary person or the user, the user is reminded.

In this embodiment, step 305 is optional. And in step 305, the third threshold may be set as actually demanded, so that when the user is in a relatively quiet environment, the user is prompted.

It can be seen from the above embodiment that when a difference between a voice volume of a user in conversation and a reference volume is greater than a preset threshold, output of reminder to the user is controlled. Hence, after receiving the reminder, the user may be aware that the conversation may affect others in the surrounding environment, thereby causing the user to lower the volume of the conversation. Thus, the user may be reminded when his/her conversation is too loud for the surrounding environment automatically according to a comparing result of the voice volume of the user in conversation and the reference volume, and user experience may be improved. Furthermore, since the reminder is triggered only when the difference is greater than the threshold, the triggering of the reminder is reasonable.

Embodiment 2

The embodiment of this disclosure further provides a reminder apparatus, corresponding to the reminder method described in Embodiment 1.

Figure 4:
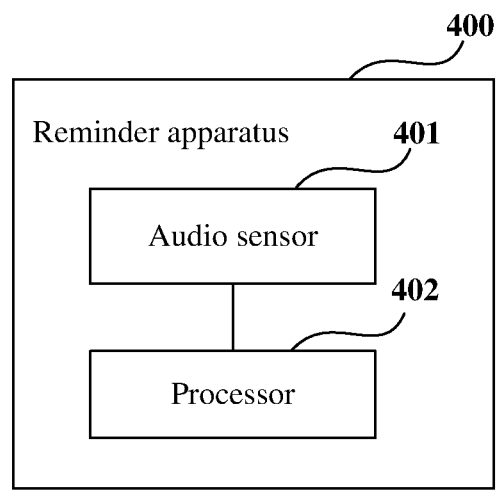
FIG. 4 is a schematic diagram of the reminder apparatus of Embodiment 2 of this disclosure.

FIG. 4 is a schematic diagram of the reminder apparatus of Embodiment 2 of this disclosure. As shown in FIG. 4, the reminder apparatus 400 includes:

an audio sensor 401 configured to output a signal corresponding to detected audio;

a processor 402 configured to:

receive from the audio sensor a voice volume of a user of an electronic device;

calculate a difference between the detected voice volume of the user and a reference volume; and control an output of a reminder to the user when the calculated difference is greater than a first threshold.

In this embodiment, when the reference volume is an environmental noise volume received by the process from the audio sensor, the processor 402 may be further configured to:

detect the user beginning a conversation;

receive from the audio sensor the environmental noise volume over a preset period of time after the beginning of the conversation is detected;

calculate an average volume of detected environmental noise volume over the preset period of time; and setting the calculated average volume as the environmental noise volume.

In this embodiment, the processor 402 may be further configured to:

update the environmental noise volume by using an average volume over a current preset period of time when an amount of change of the average volume of environmental noise volumes within the current preset period of time relative to the environmental noise volume is greater than a second threshold.

In this embodiment, the amount of change may be an absolute value of a difference between the average volume over the current preset period of time and the environmental noise volume, and what is measured by it is a level of change of the average volume over the current preset period of time relative to a previous volume;

In this embodiment, the processor 402 may be further configured to:

determine the first threshold according to at least one of: an environment of the user, a location of the user, or a current time.

In this embodiment, when the reference volume is a default volume or a normal volume of the user, the processor 402 may be further configured to:

acquire the default volume; or learn the normal volume of the user; and calculate a difference between the detected voice volume and the default volume or the normal volume of the user.

In this embodiment, when the difference is greater than the first threshold and the environmental noise volume is less than a third threshold, the processor is configured to output the reminder to the user.

In this embodiment, the audio sensor 401 may include:

a first microphone configured to detect the voice volume of the user; and a second microphone configured to detect the environmental noise volume.

It can be seen from the above embodiment that when a difference between a voice volume of a user in conversation and a reference volume is greater than a preset threshold, output of reminder to the user is controlled. Hence, after receiving the reminder, the user may be aware that the conversation may affect others in the surrounding environment, thereby causing the user to lower the volume of the conversation. Thus, the user may be reminded when his/her conversation is too loud for the surrounding environment automatically according to a comparing result of the voice volume of the user in conversation and the reference volume, and user experience may be improved. Furthermore, since the reminder is triggered only when the difference is greater than the threshold, the triggering of the reminder is reasonable.

Embodiment 3

Figure 5:
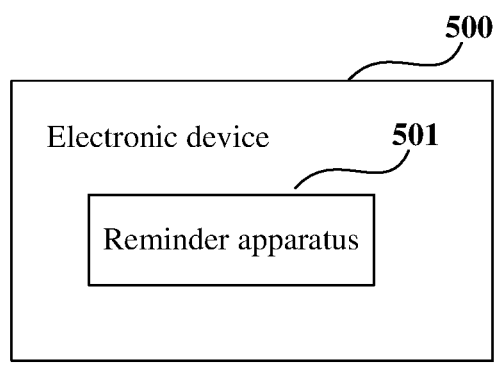
FIG. 5 is a schematic diagram of the electronic device of Embodiment 3 of this disclosure.

The embodiment of this disclosure further provides an electronic device. FIG. 5 is a schematic diagram of the electronic device of Embodiment 3 of this disclosure. As shown in FIG. 5, the electronic device includes a reminder apparatus 501, a structure and functions of the reminder apparatus 501 being identical to those contained in Embodiment 2, and will not be described herein any further.

Figure 6:
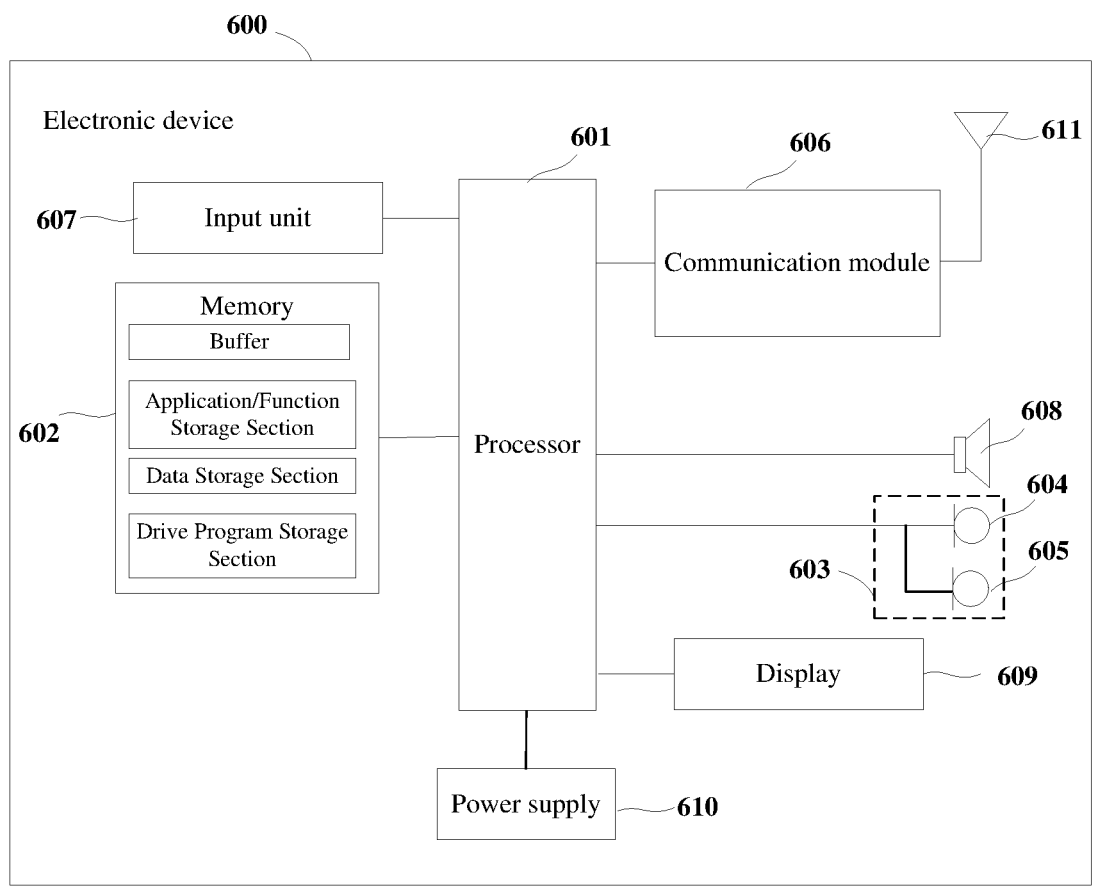
FIG. 6 is a block diagram of a systematic structure of the electronic device of Embodiment 3 of this disclosure.

FIG. 6 is a block diagram of a systematic structure of the electronic device of Embodiment 3 of this disclosure. As shown in FIG. 8, the electronic device 600 may include a processor 601 and a non-transitory memory 602, the memory 602 being coupled to the processor 601. The memory 602 stores a program (PROG). The PROG is configured to include program instructions that, when executed by the processor 601, enable the electronic device 600 to operate in accordance with the embodiments of the present disclosure, as discussed herein with the above methods.

In this embodiment, the electronic device 600 may further include an audio sensor 603, the audio sensor 603 may include:

a first microphone 604 configured to detect the voice volume of the user; and a second microphone 605 configured to detect the environmental noise volume.

For example, first microphone 604 is set at the bottom of the mobile phone, which is close to a mouse of a user, and the second microphone 605 is set at the top of the reverse side of the mobile phone to detect environmental noise.

In the conversation, since sound sources of the environmental noises are usually far away from the user, an environmental noise signal detected by the first microphone 604 is the same as an environmental noise signal detected by the second microphone 605. A sound signal collected by the first microphone 604 is added to an inversion signal of a sound signal detected by the second microphone 605, and the adding result is the actual voice signal of the user.

As shown in FIG. 6, the electronic device 600 may further include a communication module 606, an input unit 607, a loudspeaker 608, a display 609, a power supply 610 and an antenna 611. It should be noted that the electronic device 600 does not necessarily include all the parts shown in FIG. 6, and furthermore, the electronic device 600 may include parts not shown in FIG. 6, and the prior art may be referred to.

In this embodiment, at least one of the loudspeaker 606 and the display 609 is configured to output a reminder to the user based on control of an outputting unit of the reminder apparatus. For example, the loudspeaker 606 outputs a specific voice or music, and the display 609 outputs a specific picture.

In this embodiment, the electronic device 600 does not necessarily include all the parts shown in FIG. 6.

As shown in FIG. 6, the processor 601 is sometimes referred to as a controller or control, which may include a microprocessor or other processor devices and/or logic devices, and the processor 601 receives input and controls operations of every components of the electronic device 600.

FIG. 6 is illustrative only, and other types of structures may also be used, to supplement or replace this structure and achieve a telecommunications function or other functions.

It can be seen from the above embodiment that when a difference between a voice volume of a user in conversation and a reference volume is greater than a preset threshold, output of reminder to the user is controlled. Hence, after receiving the reminder, the user may be aware that the conversation may affect others in the surrounding environment, thereby causing the user to lower the volume of the conversation. Thus, the user may be reminded when his/her conversation is too loud for the surrounding environment automatically according to a comparing result of the voice volume of the user in conversation and the reference volume, and user experience may be improved. Furthermore, since the reminder is triggered only when the difference is greater than the threshold, the triggering of the reminder is reasonable.

An embodiment of the present disclosure provides a computer readable program code, which, when executed in a reminder apparatus or an electronic device, will cause the computer to carry out the reminder method as described in Embodiment 1 in the reminder apparatus or the electronic device.

An embodiment of the present disclosure provides a computer readable medium, including a computer readable program code, which will cause the computer to carry out the reminder method as described in Embodiment 1 in a reminder apparatus or an electronic device.

The reminder method for reminding carried out in the reminder apparatus described with reference to the embodiments of this disclosure may be directly embodied as hardware, software modules executed by a processor, or a combination thereof. For example, one or more functional block diagrams and/or one or more combinations of the functional block diagrams shown in FIG. 4 may either correspond to software modules of procedures of a computer program, or correspond to hardware modules. Such software modules may respectively correspond to the steps shown in FIGS. 1, 2 and 3. And the hardware module, for example, may be carried out by firming the soft modules by using a field programmable gate array (FPGA).

The instructions for performing the methods described herein may be located in a non-transitory computer readable medium, e.g., RAM, flash memory, ROM, EPROM, EEPROM, a register, a hard disc, a floppy disc, a CD-ROM, or any memory medium in other forms known in the art. The non-transitory computer readable medium (memory medium) may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, when equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 4 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 4 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

The invention claimed is:

1. A reminder method performed by an electronic device, the method comprising:
   detecting with a processor of the electronic device a user of the electronic device beginning a conversation;
   detecting with an audio sensor a detected environmental noise volume over a preset period of time after the beginning of the conversation is detected;
   calculating with the processor an average volume of the detected environmental noise volume over the preset period of time;
   setting the calculated average volume as an average environmental noise volume;
   detecting a voice volume of the user using the audio sensor of the electronic device;
   calculating using the processor a difference between the detected voice volume and the average environmental noise volume; and
   controlling with the processor an output of a reminder to the user when the calculated difference is greater than a first threshold.

2. The method according to claim 1, wherein the method further comprises:
   updating with the processor the average environmental noise volume by using an average volume within a current preset period of time when an amount of change of the average volume of detected environmental noise volumes over the current preset period of time relative to the average environmental noise volume is greater than a second threshold.

3. The method according to claim 1, wherein the method further comprises:
   determining with the processor the first threshold according to east one of: an environment of the user, a location of the user, or a current time.

4. The method according to claim 1, wherein the reminder to the user comprises at least one of:
   playing a specific sound or displaying a visual cue.

5. A reminder apparatus comprising:
   an audio sensor configured to output a signal corresponding to detected audio;
   a processor configured to:
      detect a user of the electronic device beginning a conversation;
      receive from the audio sensor a detected environmental noise volume over a preset period of time after the beginning of the conversation is detected;

calculate an average volume of the detected environmental noise volume over the preset period of time; and set the calculated average volume as an average environmental noise volume;

receive from the audio sensor a voice volume of the user;

calculate a difference between the detected voice volume of the user and the average environmental noise volume; and control an output of a reminder to the user when the calculated difference is greater than a first threshold.

6. The apparatus according to claim 5, wherein the processor is further configured to:

update the average environmental noise volume by using an average volume within a current preset period of time when an amount of change of the average volume of detected environmental noise volumes over the current preset period of time relative to the average environmental noise volume is greater than a second threshold.

7. The apparatus according to claim 5, wherein the processor is further configured to:

determine the first threshold according to at least one of: an environment of the user, a location of the user, or a current time.

8. The apparatus according to claim 5, wherein the reminder comprises at least one of a specific sound or video cue.

9. The apparatus according to claim 5, wherein, the audio sensor comprises:

a first microphone configured to detect the voice volume of the user; and a second microphone configured to detect the detected environmental noise volume.

10. An electronic device, comprising:

the reminder apparatus as claimed in claim 5; and a loudspeaker and/or a display configured to output a reminder to a user based on control of the processor of the reminder apparatus.

\* \* \* \* \*